US005678293A

United States Patent [19]

Sturdevant

[11] Patent Number: 5,678,293

[45] Date of Patent: Oct. 21, 1997

[54] TOOL FOR SPREADING OPPOSED MEMBERS APART

[75] Inventor: George A. Sturdevant, Kingwood, Tex.

[73] Assignee: George A. Sturdevant, Inc., Kingswood, Tex.

[21] Appl. No.: 541,695

[22] Filed: Oct. 10, 1995

[51] Int. Cl.$^6$ .......... B23P 19/04

[52] U.S. Cl. .......... 29/239; 29/254

[58] Field of Search .......... 29/239, 252, 426.5, 29/402.02; 81/485; 254/93 R

[56] References Cited

U.S. PATENT DOCUMENTS

| | | | |
|---|---|---|---|
| 2,350,404 | 6/1944 | Liston | 29/239 |
| 3,081,066 | 3/1963 | Murawski | 29/239 |
| 3,426,752 | 2/1969 | Laico | 29/239 |
| 3,662,994 | 5/1972 | Johns | 29/239 |
| 3,762,688 | 10/1973 | Leonhardt | 29/239 |
| 3,835,522 | 9/1974 | Ward | 29/239 |
| 4,443,001 | 4/1984 | Haerer | 29/239 |
| 4,896,862 | 1/1990 | Ganley | 254/1 |
| 5,048,795 | 9/1991 | Vitale | 29/239 |
| 5,542,646 | 8/1996 | Bunyan | 29/239 |

FOREIGN PATENT DOCUMENTS

| | | | |
|---|---|---|---|
| 2436311 | 2/1976 | Germany | 29/239 |
| 145076 | 11/1979 | Japan | 29/239 |

*Primary Examiner*—David P. Bryant
*Attorney, Agent, or Firm*—Bush, Riddle & Jackson

[57] ABSTRACT

A spreader tool (10) and method for spreading apart a pair of opposed parts (F) comprising a housing (12) having a central bore (18) with a piston (42) mounted therein for reciprocal movement. The lower end of the piston (42) has a center spreader member (45) secured thereto and fitting between a pair of side spreader members (30, 32). Upon actuation of the cylinder (42) the center spreader member (45) moves in a parallel relation to the adjacent side spreader members (30, 32) for spreading the members (F) apart. The tool (12, 12A) may be manually actuated by a ratchet handle (66) as shown in the embodiment of FIGS. 1–3, or may be hydraulically actuated by pressurized hydraulic fluid from a pump (P) as shown in the embodiment of FIGS. 4–6.

9 Claims, 2 Drawing Sheets

TOOL FOR SPREADING OPPOSED MEMBERS APART

FIELD OF THE INVENTION

This invention relates to a tool and related method for spreading opposed parts or members apart, and more particularly to such a tool and method having movable spreader members inserted between the opposed parts for moving the opposed parts away from each other.

BACKGROUND OF THE INVENTION

Heretofore, various tools have been provided for prying or separating parts, such as rescue tools used in extricating victims in traffic accidents. Such tools have commonly utilized a pair of pivotally connected wedging jaws or arms which are positioned between the parts to be separated and then forced apart either manually or by separate power means. Since the arms are pivotally connected, the arms move in an arcuate path upon being forced apart to normally provide a relative movement between the wedging arms and the parts being separated. The relative movement between the wedging arms and the parts being forced apart tends to retract or urge the arms away from their original position between the opposed parts being separated. While such a relative movement may not be undesirable in some instances, such as many automobile accidents, for example, it is undesirable for certain uses of the tool, such as for separating a pair of opposed pipe flanges.

U.S. Pat. No. 4,896,862 dated Jan. 30, 1990 shows a rescue tool having a pair of arms pivotally connected to each other which are opened and closed by rotation of a threaded member. The threaded member may be operated manually or by a power source. It is apparent that the arms pivot in an arcuate path and would tend to slip outwardly away from the parts being separated upon movement of the arms away from each other.

SUMMARY OF THE INVENTION

The present invention is particularly directed to a tool and method for spreading opposed parts or members away from each other utilizing spreader members inserted between the opposed parts for moving the parts away from each other. An important feature of the invention is the provision of spreader members such as extending feet or fingers which are inserted between the parts to be separated with the contacting surfaces of the spreader members remaining in a parallel position during movement toward and away from each other. The tool includes an outer housing having a piston mounted in a central bore in the housing for relative movement. A lower laterally extending center foot or extension is fixed to the lower end of the piston to form a lower spreader member and a pair of spaced laterally extending feet or extensions fixed to the housing are positioned on opposed sides of the piston to form upper spreader members. The contacting surfaces of the spreader members which are positioned between the parts to be separated are serrated and remain in parallel relation to each other during movement of the piston and center spreader member away from the housing and side spreader members. The tool may be operated manually or powered by a separate power source such as hydraulic fluid, for example.

A common use of the tool comprising the present invention is for spreading a pair of parallel flanges apart such as may be required for replacement of a gasket between a pair of pipe flanges, for example. The laterally extending feet in a closed position are positioned between the flanges and the tool is then actuated to move the piston and center foot outwardly to force the flanges apart as much as around three (3) inches, for example.

The tool of the present invention is a relatively small, light and powerful precision tool generating around 10,000 pounds of spreading force. When designed for manual operation, a ratchet handle is inserted within an end socket of an actuating shaft for manual rotation. For using hydraulic power, a hydraulic cylinder of the tool is connected to a pump to provide pressurized hydraulic fluid to the cylinder for movement of the piston. When the tool of the present invention is utilized for spreading a pair of opposed flanges apart, it is desirable to use a pair of opposed tools arranged in opposed relation to each other so that a torque force is not exerted against one side of the flanges as might be applied when only one tool is utilized. The present tool may be used also for the controlled lifting of a desired member. Other uses include replacement of a shaft or replacement of an impeller on a shaft.

Other objects and features of this invention will be apparent from the following drawings and specifications.

DESCRIPTION OF THE INVENTION

MANUALLY OPERATED EMBODIMENT OF SPREADER TOOL

Figure 1:
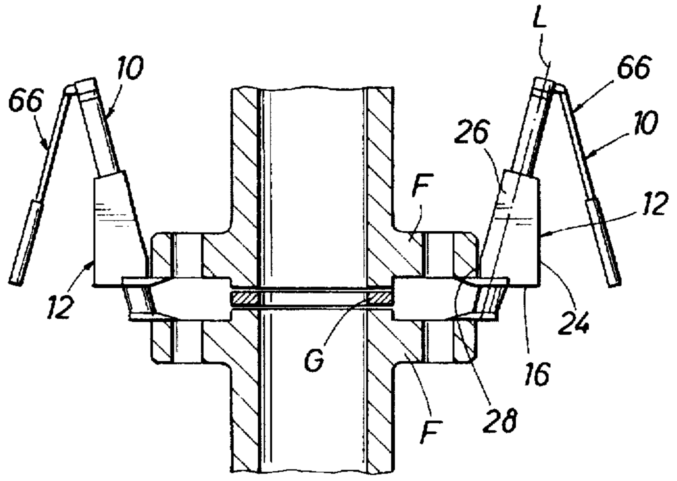
FIG. 1 is an elevational view of a pair of opposed manually operated tools comprising the present invention and shown in an extended position between a pair of pipe flanges for spreading the flanges apart.
Figure 2:
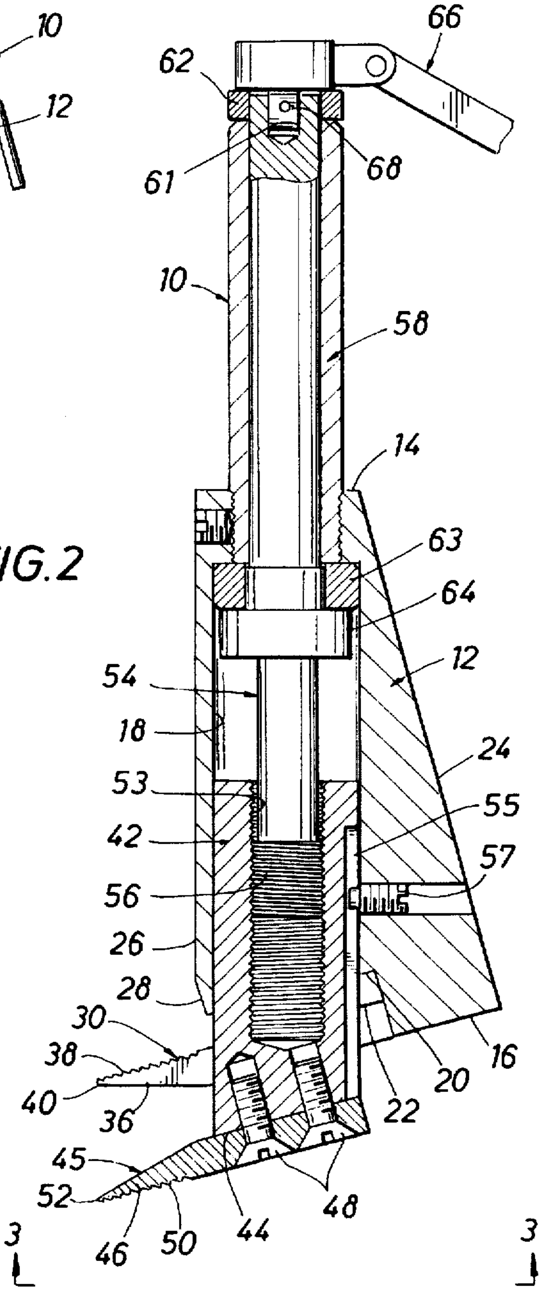
FIG. 2 is a longitudinal sectional view of the manual embodiment of the tool shown in FIG. 1 with the piston and center spreader member in a partially extended position.
Figure 3:
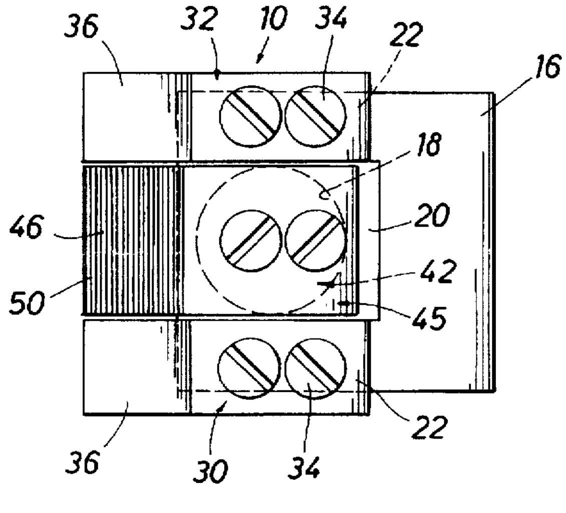
FIG. 3 is a bottom plan view looking generally along line 3—3 of FIG. 2.

Referring now to FIGS. 1–3, one embodiment of the present invention comprises a spreader tool which is actuated manually and is shown generally at 10. As shown in FIG. 1, a pair of manually operated spreader tools 10 are utilized for spreading a pair of opposed pipe flanges F apart from each other for replacement of a gasket G. By using a pair of tools in opposed relation to each other, the separating force is distributed in a generally uniform manner about the periphery of flanges F to provide a generally uniform separation of flanges F. While FIG. 1 illustrates a common application of tool 10, various other applications may be made by the present invention including, for example, replacement of an impeller on a shaft, replacement of a shaft, or to provide a controlled lifting action for a particular device as may be desired.

Manual spreader tool 10 comprises an outer housing or body generally indicated at 12 having an upper end 14 and a lower end 16 with a central bore 18 extending therebetween. Lower end 16 has a center recessed portion 20 and a pair of adjacent recessed portions 22 which are arranged in a stepped relation to center recess portion 20 to define a pair of mounting surfaces on opposed sides of bore 18. Outer housing 12 has an outer peripheral surface of a generally rectangular configuration including a rear side 24 and a front side 26. A lower front side portion 28 of front side 26 is arranged in a generally parallel relation to rear side 24 and is adapted to contact an adjacent surface of a part to be spread apart, such as flange F, for example. Upon insertion of manual tool 10 in a transversely extending void space between flanges F lower surface 28 acts as a stop if it is desired to drive housing 12 into contact with adjacent flange F.

A pair of spaced spreader members 30, 32 are mounted in face to face relation on recessed surfaces 22 of housing 12 and secured thereon by suitable screws 34. Each spreader member 30, 32 has a tapered extension or foot 36 extending laterally from housing 12 to a relatively narrow front edge 40 and defining an upper serrated engagement surface 38.

Mounted in bore 18 for reciprocal movement is a piston generally indicated at 42 having a lower mounting surface 44 which is positioned between spreader members 30, 32 on housing 12. A center spreader member 45 is secured to mounting surface 44 by screws 48 and fits between side spreader members 30, 32 when piston 42 is in a retracted closed position. Spreader member 45 has a tapered foot 46 defining a lower serrated contacting surface 50 and a narrow extending edge 52. Piston 42 has a longitudinally extending side groove 55 therein and a guide pin 57 on housing 12 is received within groove 55 for guiding piston 42 in a longitudinal movement along a longitudinal axis L as shown in FIG. 1. The upper end of piston 42 has an internally threaded blind opening 53 therein. Longitudinal axis L is arranged at a fifteen (15) degree angle to planar surfaces 24 and which extend at right angles to the transversely extending void space when tool 10 is inserted between flanges F to provide adequate space for manual actuation of piston 42. Spreader member 45 is generally similar to spreader members 30, 32 but faces in an opposite direction.

For actuating piston 42, a shaft generally indicated at 54 has a lower externally threaded end 56 which is in engagement with threaded opening 53. A tubular handle or hand grip 58 is secured to the upper end of housing 12. Shaft 54 extends through tubular handle 58 and has a socket 61 therein. An upper retaining member 62 is secured to the upper end of shaft 54 and engages the upper end of hand grip 58 to retain shaft 54 within tubular handle 58. Enlarged diameter portion 64 of shaft 54 engages an adjacent bearing 63 and limits upward movement of shaft 54 within housing 12. For rotation of shaft 54 and movement of piston 42, a removable ratchet handle 66 has an extending lug 68 which fits in socket 61 for rotation of shaft 54 upon movement of ratchet handle 66 in a clockwise direction for extension of piston 42. Ratchet handle 66 may be actuated for reverse operation to rotate shaft 54 in an opposite direction for retraction of piston 42 and spreader member 45.

As shown particularly in FIG. 2, upper serrated surface 38 on spreader members 30, 32 has serrations which are inclined in a forward direction. Lower serrated surface 50 on a center spreader member 45 has serrations which are inclined in a rearward direction. Upon movement of piston 42 from a retracted position, center spreader member 45 moves in a direction toward adjacent flanges F since piston 42 reciprocates along longitudinal axis L which is inclined at an angle of around fifteen (15) degrees when used as shown in FIG. 1. As the serrations on center spreader member 45 are inclined in a rearward direction, the serrations easily move over the adjacent flange surface when piston 42 is projected and tend to "bite" into the adjacent flange surface if tool 10 tends to move away from flanges F.

OPERATION OF MANUAL EMBODIMENT

In operation, with piston 42 retracted to a closed position in which center spreader member 45 is in engagement with recessed surface 20, the extending edges 40, 52 of feet 36, 46, are inserted within a space between the parts to be separated. If the space between the parts to be separated is not adequate, tool 10 may be driven by a hammer or the like to force feet 36, 46 between the opposed surfaces to be separated until surface 28 contacts an adjacent surface of a part to be separated. After tool 10 has been positioned between the parts to be separated, such as flanges F shown in FIG. 1, lug 68 of removable ratchet handle 66 is inserted within socket 61 and shaft 54 rotated in a clockwise direction as viewed from the upper end of tool 10 thereby to extend piston 42 and spreader member 45 to a desired spacing relative to the adjacent spreader members 30, 32. If a pair of tools 10 are utilized, the tools are extended in a generally uniform manner. Serrated surfaces 38 and 50 which are parallel to each other move away from each other in parallel relation and are in engagement with opposed surfaces on flanges F to be separated. Center foot 46 tends to move forwardly of feet 36 a slight amount as a result of the inclination of longitudinal axis L. Upon replacement of gasket G, tools 10 are actuated to retract the associated pistons 42 to a desired position for removing tools 10.

HYDRAULICALLY OPERATED EMBODIMENT OF SPREADER TOOL

Figure 5:
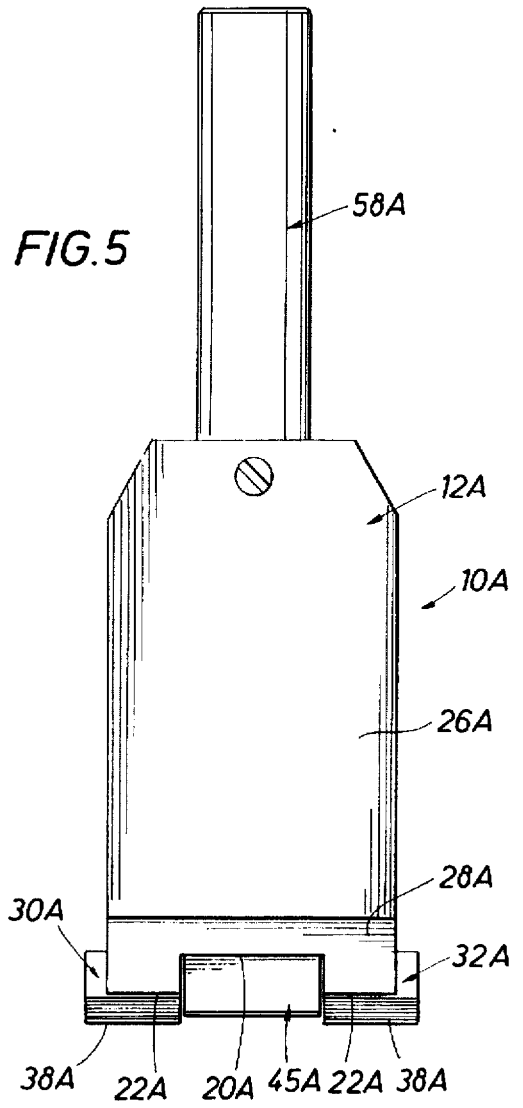
FIG. 5 is a front elevation of the tool shown in FIG. 4.
Figure 4:
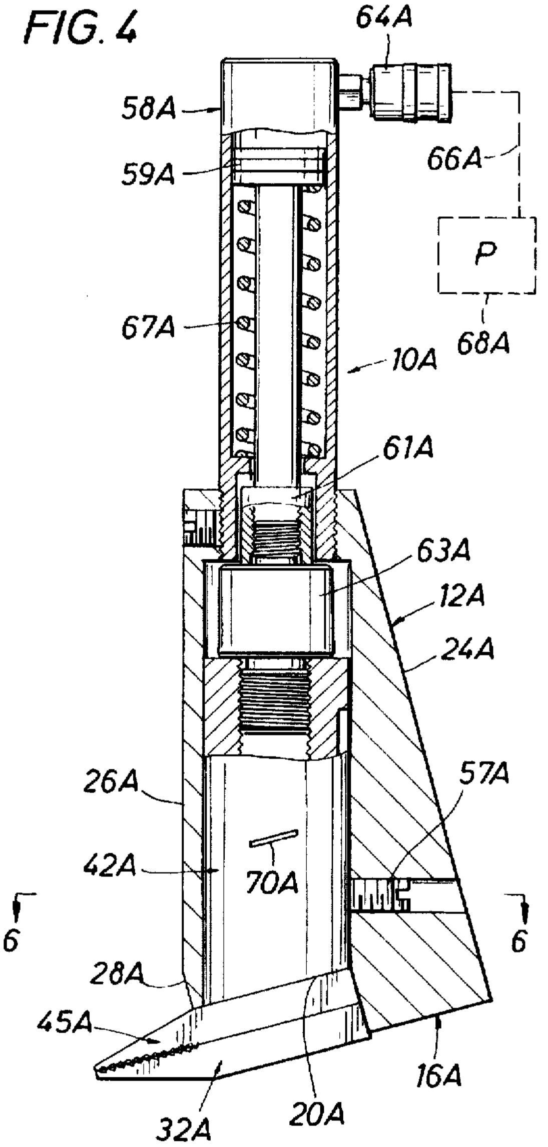
FIG. 4 is a longitudinal sectional view of another embodiment of the invention which is hydraulically operated and illustrates the spreader members in a retracted position.
Figure 6:
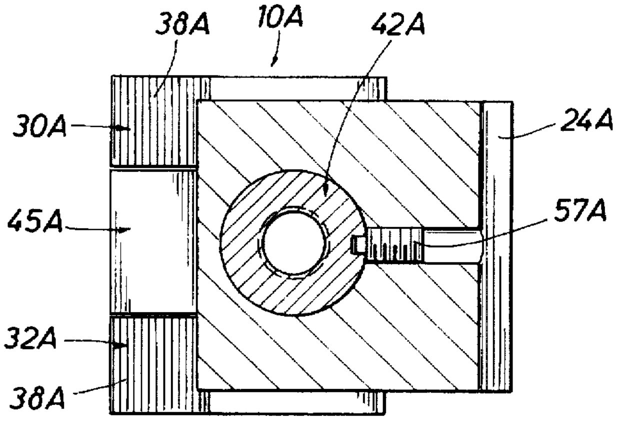
FIG. 6 is a cross sectional view taken generally along line 6—6 of FIG. 4.

Referring now to FIGS. 4–6, a separate embodiment of the tool comprising the present invention is shown at 10A. Tool 10A is hydraulically powered and functions in a similar manner except in regard to the means for providing the power for actuating piston 42A. Tool 10A includes housing 12A receiving piston 42A with center spreader member 45A secured to the lower end of piston 42A. Side spreader members 30A and 32A having serrated contacting surfaces 38A are secured to the lower end of housing 12A. Recessed surfaces 20A and 22A are provided for spreader members 30A, 32A, and 45A in a manner similar to the arrangement shown in FIGS. 2 and 3. Housing 12A has a rear surface 24A and a front surface 26A with a lower front side portion 28A. Guide 57A guides the movement of piston 42A in a longitudinal direction as in the embodiment of FIGS. 2 and 3.

An upper single acting cylinder 58A is secured to lower housing 12A. An upper piston 59A mounted within cylinder 58A has a reduced diameter stem or rod 61A secured thereto and extending downwardly within cylinder 58A. An adapter 63A connects lower piston 42A with upper piston 59A for movement therewith. A fluid inlet fitting 64A is connected to cylinder 58A and adapted to be connected to a removable hydraulic fluid line 66A extending to a source 68A of hydraulic fluid such as pump P. For retraction of piston 42A, a return compression spring 67A bottomed on cylinder 58A is positioned about piston red 61A and against piston 59A. Spring 67A is compressed upon downward movement of piston 59A. Upon depressurizing of cylinder 58A from pump P, compressed spring 67A returns piston 59A and connected piston 42A to retracted position. Pump P and connecting fluid line 66A may then be removed from fitting 64A if not in use. FIG. 4 shows center spreader member 45A and side spreader members 30A and 32A in a fully retracted position of piston 42A the spreader members.

OPERATION OF HYDRAULIC EMBODIMENT

In operation, spreader members 30A, 32A, and 45A of tool 10A in the closed position of FIG. 4 are inserted between a pair of members to be spaced apart such as illustrated in FIG. 1 for the embodiment of FIGS. 1–3. Then, hydraulic fluid line 66A is connected to inlet fitting 64A from pump P. Upon actuation of pump P hydraulic fluid is supplied to cylinder 58A to move piston 59A and piston 42A downwardly for movement of center spreader member 45A relative to side spreader members 30A and 32A to spread the adjacent parts. An indicator mark shown at 70A on piston 42A is exposed from housing 42A upon the full extension of piston 42A and may be viewed to show the maximum extension of piston 42A which, for example, may be around 3 inches for most applications.

While preferred embodiments of the present invention have been illustrated in detail, it is apparent that modifications and adaptations of the preferred embodiment will occur to those skilled in the art. However, it is to be expressly understood that such modifications and adaptations are in the spirit and scope of the present invention as set forth in the following claims.

What is claimed is:

1. A tool for spreading a pair of opposed flanges apart and operable to fit into a transversely extending void space between said opposed flanges; said tool comprising:

an elongate housing having a central bore therethrough and defining an upper end and a lower end, said elongate housing having a longitudinal axis slanted outwardly relative to said transversely extending void space;

a piston mounted within said bore for reciprocal movement along said longitudinal axis and operable for extending outwardly beyond said lower end;

a first spreader member mounted on the end of said piston for movement with said piston and having a tapered foot extending laterally beyond said housing;

a second spreader member extending in a plane generally parallel to said first spreader member and having a tapered foot mounted on said housing for extending laterally beyond said housing the same extent as said first spreader member; and means for selectively moving said piston in a direction along said longitudinal axis for moving said spreader members in a generally parallel relation to each other, said spreader members operable for insertion between said pair of opposed flanges for forcing said opposed flanges apart upon movement of said piston in one direction;

each of said tapered feet having serrations thereon, the serrations on said first spreader member inclined in a rearward direction for biting into an adjacent flange upon outward movement of said tool after inserted between said flanges.

2. A tool as set forth in claim 1 wherein:

a rotatable shaft is operably connected to said piston; and manual gripping means adjacent said upper end of said housing is operably connected to said shaft for rotation of said shaft and movement of said piston.

3. A tool as set forth in claim 1 wherein:

a fluid cylinder is secured to said housing and receives said piston therein; and a source of hydraulic fluid is connected to said fluid cylinder for selectively actuating said piston for movement of said first spreader member relative to said second spreader member.

4. A tool as set forth in claim 1 wherein said housing has a lower inclined front side extending at right angles to said transversely extending void space for engaging an adjacent flange when said tool is inserted between said flanges for stopping inward movement of said tool.

5. A tool as set forth in claim 4 wherein the longitudinal axis of said housing is slanted outward at an angle of about fifteen (15) degrees to said inclined front side to facilitate operation of said tool.

6. A tool for spreading a pair of opposed flanges apart and operable to fit into a transversely extending void space between said opposed flanges; said tool comprising:

an elongate housing having a central bore therethrough and defining an upper end and a lower end, said central bore having a longitudinal axis slanted outwardly relative to said transversely extending void space;

a piston mounted within said bore for reciprocal movement along said longitudinal axis and operable for extending outwardly beyond said lower end;

a center spreader member mounted on the end of said piston for movement with said piston and having a tapered foot extending laterally beyond said housing, said tapered foot having a lower surface with serrations thereon inclined in a rearward direction;

a fixed side spreader member on each side of said center spreader member, each side spreader member extending in a plane generally parallel to said center spreader member and having a tapered foot mounted on said housing for extending laterally beyond said housing the same extent as said center spreader member, the upper surface of said tapered foot for said fixed side spreader member having serrations thereon inclined in a forward direction;

said spreader members operable for insertion between said pair of opposed flanges with said serrations in contact with said flanges for forcing said opposed flanges apart; and means for moving said piston and said center spreader member along said longitudinal axis slanted outwardly relative to said transversely extending void space.

7. A tool as set forth in claim 6 wherein said housing has a lower inclined front side extending at right angles to said transversely extending void space for engaging an adjacent flange where said tool is inserted between said flanges for stopping inward movement of said tool.

8. A tool as set forth in claim 7 wherein the longitudinal axis of said housing is slanted outward at an angle of about fifteen (15) degrees to facilitate operation of said tool.

9. A tool as set forth in claim 6 wherein said housing has a lower end with a center recessed portion therein to receive said center spreader member, said housing having steps adjacent said center recessed portion for mounting said side spreader members thereon.

* * * * *